(12) United States Patent
Hoong et al.

(10) Patent No.: US 8,822,736 B2
(45) Date of Patent: Sep. 2, 2014

(54) PROCESS FOR PREPARING POLYMERS OF POLYHYDRIC ALCOHOLS

(75) Inventors: Seng Soi Hoong, Selangor (MY); Norin Zamiah Kassim Shaari, Selangor (MY); Salmiah Ahmad, Selangor (MY); Hazimah Abu Hassan, Selangor (MY)

(73) Assignee: Malaysian Palm Oil Board, Kajang, Selangor (MY)

( * ) Notice: Subject to any disclaimer, the term of this patent is extended or adjusted under 35 U.S.C. 154(b) by 245 days.

(21) Appl. No.: 12/091,638

(22) PCT Filed: Oct. 19, 2006

(86) PCT No.: PCT/MY2006/000023
§ 371 (c)(1),
(2), (4) Date: Jun. 4, 2010

(87) PCT Pub. No.: WO2007/049950
PCT Pub. Date: May 3, 2007

(65) Prior Publication Data
US 2010/0240929 A1    Sep. 23, 2010

(30) Foreign Application Priority Data
Oct. 26, 2005    (MY) .............................. PI20055043

(51) Int. Cl.
*C07C 43/00*    (2006.01)
*C08G 65/34*    (2006.01)

(52) U.S. Cl.
CPC ...................................... *C08G 65/34* (2013.01)
USPC ............................ 568/680; 568/619; 568/679

(58) Field of Classification Search
CPC ................................ C07C 41/09; C07C 43/13
USPC ......................................... 568/619, 679, 680
See application file for complete search history.

(56) References Cited

U.S. PATENT DOCUMENTS

| 2,487,208 A | 11/1949 | Alsop |
| 3,968,169 A | 7/1976 | Seiden et al. |
| 4,551,561 A | 11/1985 | Stuehler |
| 4,960,953 A | 10/1990 | Jakobson et al. |
| 5,635,588 A | 6/1997 | Eshuis et al. |
| 5,710,350 A | 1/1998 | Jeromin et al. |

FOREIGN PATENT DOCUMENTS

| JP | 61-238749 | 10/1986 |
| JP | 2-169535 | 6/1990 |
| WO | WO 94/18259 A | 8/1994 |
| WO | WO 95/16723 A | 6/1995 |
| WO | WO-95/21210 | 8/1995 |
| WO | WO 2004/065343 A2 | 8/2004 |
| WO | WO 2004065343 A2 * | 8/2004 |

* cited by examiner

Primary Examiner — Sudhakar Katakam
(74) Attorney, Agent, or Firm — Fish & Richardson P.C.

(57) ABSTRACT

The present invention relates to a process for accelerated preparation of linear polymers of polyhydric alcohols using microwave irradiation as the heat element in the presence of specified catalysts.

14 Claims, No Drawings

PROCESS FOR PREPARING POLYMERS OF POLYHYDRIC ALCOHOLS

The present invention relates to a process for accelerating the conversion of linear polymers of polyhydric alcohols from their monomers in the presence of catalysts using microwave irradiation.

BACKGROUND ART

The present invention relates to the process of the production of polyhydric alcohols from their monomers. Examples of monomers that could be subjected to this process are glycerol, ethylene glycol, propylene glycol, sorbitol, sucrose, D-glucose and fructose. This list is by no means exhaustive. Polyglycerol is defined as a polymer containing two or more units of glycerol and it may be either linear or branched.

Numerous methods are known for the preparation of polyglycerols with earlier works evolved around the use of thermal dehydration of glycerol. The polymerisation was carried out at atmospheric pressure and at an elevated temperature, which is about 270° C. –280° C. as mentioned in U.S. Pat. No. 2,487,208. The process can be accomplished without the use of catalyst but the yield of polyglycerol is considerably low as reported by Hauschild and Petit (1956). Therefore, various catalysts have been introduced to aid in the formation of polyglycerol such as mixtures of sulphuric acid and triacetin as described in U.S. Pat. No. 3,968,169, hypophosphorus acid with sodium hydroxide as appeared in U.S. Pat. No. 4,551,561, alkaline carbonates such as potassium carbonate with aluminium oxide as in J.P. No. 61,238,749 and sodium or potassium hydroxide as in U.S. Pat. No. 5,710,350.

Polyglycerol formation was also reported with either solketal, glycidol or glycerol carbonate as the reactants when reacted with hydrotalcite at elevated temperatures as described in W.O. Pat. No. 9,516,723. Other than that, rubidium, caesium and potassium fluoride salts on alumina or zeolites were used as catalyst for the polymerisation of glycerol. In addition, glycidol, glycerol carbonate and solketal were polymerised using the above fluoride salts into polyglycerol as reported in W.O. Pat. No. 9,521,210. Other than that, in U.S. Pat. No. 5,635,588, both linear and cyclic polyglycerols were products of reaction between glycidol, glycerol carbonate and solketal with beta-zeolites as catalysts.

While some other literatures reported the use of epichlorohydrin in the process to prepare polyglycerol, in U.S. Pat. No. 4,960,953, Jakobson et. al. disclosed a process to produce polyglycerol, which comprised reacting glycerol, diglycerol or higher polyglycerol with epichlorohydrin at 90° C. to 170° C. to produce a crude chlorohydrin/ether mixture, followed by adding an amount of strong base at least substantially equivalent to the organically bound chlorine content of the chlorohydrin/ether mixture, and desalting the mixture and recovering the glycerol, diglycerol and higher polyglycerol fractions.

Allyl alcohol is another route in preparing polyglycerols. The process involve depoxidation of the ally/alcohol, in which glycidol would be formed and then followed by polymerisation of the glycidol. This was proven as another effective method to prepare polyglycerol as shown in J.P. No. 2,169,535.

Despite the fact that the background art in preparing polyglycerol is crowded and diverse, it is evident that the synthesis of polyglycerol and diglycerol from glycerol has one major drawback, which is the duration of reaction. It is a usual practice to have a reaction time of minimum 5 hours to 72 hours to carry out polymerisation with a mixed yield of glycerol, digycerol, triglycerol and other higher polyglycerols. Other preparation such as those that involve epichlorohydrin may polymerise at a faster rate, but polyglycerols produced from epichlorohydrin are not particularly favoured by the industry, as there may still be organically bound chlorine in the polyglycerols.

SUMMARY OF THE INVENTION

Prior art for the preparation of diglycerols and higher polyglycerols suffer from low yields and/or very long reaction times. This invention provides a process to reduce the reaction time required for the production of diglycerol and higher polyglyerols. This is achieved by subjecting glycerol to the irradiation of microwave, which acts as a heat element for the polymerisation reaction. Microwave irradiation is proven to have accelerated the reaction greatly, in which the reaction time may be reduced to minutes. This new approach was coupled with the use of specific catalysts for the formation of linear diglycerol and higher polyglycerols from glycerol.

In the present invention, glycerol is exposed to microwave irradiation for a certain period of time in the presence of a specific catalyst. Prolonged heating is to be avoided, as it will favour the formation of high degree polyglycerols such as heptaglycerol, which is not favourable. Therefore, the duration and/or strength of the microwave irradiation are critical in determining the composition of the end products.

The specific catalysts used in the process are chosen to give significantly high conversion percentage of glycerol to its polymers which are preferably, only linear diglycerol and higher polyglycerols. In this invention, high temperatures are employed to drive the conversion of glycerol to diglycerol and polyglycerols as milder temperatures tend to give poor yields of diglycerol and polyglycerols. However, colouration of the end products will result if the reaction temperature employed is too high. Therefore, an optimal range of reaction temperature is chosen to produce high yields of diglycerol and polyglycerols of a good quality.

After the specific required reaction time, the end product obtained from the process is subjected to filtration to remove the catalyst. Further removal of the catalyst may be achieved by subjecting an aqueous solution of the end product through an ion exchange column. The crude end product mixture is then dried from water by means of distillation. The dried crude end product is sent for HPLC analysis and based on the HPLC chromatogram; the composition of the crude end product may comprise of unreacted glycerol, diglycerol, tiglycerol, tetraglycerol, pentaglycerol and hexaglycerol.

DETAILED DESCRIPTION OF THE INVENTION

The present invention provides a significantly expedited process when compared with conventional processes for the preparation of diglycerol and polyglycerols from glycerol. The reaction time taken to produce diglycerol and polyglycerols, is reduced to about 20 to 30 minutes whereas the conventional methods may take about 5 hours to 72 hours. This reduction in the conversion time is as a result of the use of microwave irradiation, in which the glycerol is heated in a 900 W microwave oven in the presence of a specific catalyst and stirred with the aid from a magnetic stirrer.

It has been reported that polymerisation of glycerol to form polyglycerols can be carried out without the use of catalyst but the reaction suffered low yield of polyglycerols. Therefore, in this invention, a catalyst is selected to increase the yield of the desired polyglycerols. It is found out that organic acid salts of alkaline metals gave good yields and selectivity in producing diglycerol and polyglycerols from glycerol. Examples of catalysts employed in the reaction are potassium acetate, sodium acetate anhydrous, sodium acetate trihydrate, sodium formate, tri-sodium citrate and potassium citrate. In the process, about 0.5 to 10 wt percent and, more preferably 0.5 to 1.0 percent of catalysts are employed based on the weight of glycerol.

For this invention, the temperature may be in the range of 200° C. to 310° C., but preferably in the range of 250° C. to 270° C. By employing temperatures in this range, it is possible to achieve good conversion with minimal undesired side products while still obtaining acceptable reaction rates. It is preferred that the process is conducted at atmospheric pressure and therefore the use of costly high-pressure equipment is avoided.

The yield of crude end products, which will typically comprise of unreacted glycerol and between 78%-85% of diglycerol and polyglycerols by weight of the glycerol. The yield of individual glycerol polymers and the selectivity of the reaction can be ascertained by analysing the crude end product of the products using High Performance Liquid Chromatography (HPLC). The conversion percentage of glycerol to polyglycerol typically ranges from 75%-85%, with about 15%-20% of unreacted glycerol. The following is a typical composition percentage of the glycerol polymers analysed through HPLC.

Typical composition of glycerol polymers:
  15%-20% of unreacted glycerol
  25%-30% of diglycerol
  20%-25% of triglycerol
  10%-15% of tetraglycerol
  15%-10% of pentaglycerol
  1%-5% of hexaglycerol From the HPLC chromatogram, there is little or no evidence of cyclic diglycerol or polyglycerols found in the crude end product when compared to standard polymers of glycerol. Therefore, the process selectively produces linear diglycerol and polyglycerols from glycerol.

The crude end product may be diluted with an equal amount of deionised water and is then subjected through a column of cationic ion exchanger such as Amberlite 1R-120 to remove dissolved catalysts. The crude end product is then subjected distillation to remove the water added earlier.

The following examples illustrate the process of the invention but are limitative thereof.

Example 1

Glycerol (50 g) was charged into a 250 ml round bottom flask and then into the same flask was added 0.5 g of potassium acetate. The mixture was stirred for a minute with a magnetic stirrer in the 900 W microwave oven cavity in order to homogenise the mixture. Then, the microwave oven was programmed to raise the temperature from ambient to 270° C. in 2 minutes and this temperature was maintained for another 15 minutes, after which the cooling process was started to mark the end of reaction. The total reaction time was just mere 17 minutes. After the end product was cooled, an equal amount of deionised water was added to the end product in order to dilute the viscous product. The diluted product was then subjected through an ion exchange column to remove dissolved catalysts. The treated end product was later subjected to distillation to remove water. The treated end product was then subjected to High Performance Liquid Chromatography (HPLC) and the compositions of each polymers of glycerol were as below. The treated polyglycerols yield was 81% and the conversion percentage of glycerol to polyglycerol was 80%.

Typical composition of glycerol polymers for reaction product of Example 1:
  19.6% of unreacted glycerol
  25.4% of diglycerol
  22.0% of triglycerol
  15.6% of tetraglycerol
  10.5% of pentaglycerol
  6.9% of hexaglycerol Example 2

The same experiment was repeated with 50 g of glycerol and 0.5 g (1%) of sodium acetate anhydrous as the catalyst. The microwave oven was programmed to raise the temperature from ambient to 270° C. in 2 minutes and this temperature was maintained for another 23 minutes, after which the cooling process was started to mark the end of reaction. The total reaction time was 25 minutes. The reaction product was worked-up as described in Example 1 and HPLC analysis revealed the compositions of each polymers of glycerol were as below. The treated polyglycerols yield was 83% and the conversion percentage of glycerol to polyglycerol was 74%.

Typical composition of glycerol polymers for reaction product of Example 2:
  26.1% of unreacted glycerol
  28.9% of diglycerol
  20.7% of triglycerol
  12.7% of tetraglycerol
  7.4% of pentaglycerol
  4.2% of hexaglycerol Example 3

The same experiment was repeated with 50 g of glycerol and 0.5 g (1%) of sodium formate as the catalyst. The microwave oven was programmed to raise the temperature from ambient to 270° C. in 2 minutes and this temperature was maintained for another 28 minutes, after which the cooling process was started to mark the end of reaction. The total reaction time was 30 minutes. The reaction product was also worked-up as described in Example 1 and HPLC analysis revealed the compositions of each polymers of glycerol were as below. The treated polyglycerols yield was 81% and the conversion percentage of glycerol to polyglycerol was 79%.

Typical composition of glycerol polymers for reaction product of Example 3:
  18.5% of unreacted glycerol
  25.0% of diglycerol
  22.0% of triglycerol
  16.0% of tetraglycerol
  11.0% of pentaglycerol
  7.5% of hexaglycerol Example 4

The same experiment was repeated with 50 g of glycerol and 0.5 g (1%) of tri-sodium citrate as the catalyst. The microwave oven was programmed to raise the temperature from ambient to 270° C. in 2 minutes and this temperature was maintained for another 38 minutes, after which the cooling process was started to mark the end of reaction. The total reaction time was 40 minutes. The reaction product was also worked-up as described in Example 1 and HPLC analysis revealed the compositions of each polymers of glycerol were as below. The treated polyglycerol yield was 85% and the conversion percentage of glycerol to polyglycerol was 74%. Typical composition of glycerol polymers for reaction product of Example 4:
- 26.0% of unreacted glycerol
- 29.1% of diglycerol
- 20.6% of triglycerol
- 12.7% of tetraglycerol
- 7.7% of pentaglycerol
- 3.9% of hexaglycerol Example 5

The same experiment was repeated with 50 g of glycerol and 0.5 g (1%) of potassium citrate as the catalyst. The microwave oven was programmed to raise the temperature from ambient to 270° C. in 2 minutes and this temperature was maintained for another 23 minutes, after which the cooling process was started to mark the end of reaction. The total reaction time was 25 minutes. The reaction product was also worked-up as described in Example 1 and HPLC analysis revealed the compositions of each polymers of glycerol were as below. The treated polyglycerol yield was 84% and the conversion percentage of glycerol to polyglycerol was 72%. Typical composition of glycerol polymers for reaction product of Example 5
- 28.0% of unreacted glycerol
- 30.0% of diglycerol
- 20.4% of triglycerol
- 11.9% of tetraglycerol
- 6.5% of pentaglycerol
- 3.2% of hexaglycerol Example 6

The same experiment was repeated with 50 g of glycerol and 0.5 g (1%) of sodium acetate trihydrate as the catalyst. The microwave oven was programmed to raise the temperature from ambient to 270° C. in 2 minutes and this temperature was maintained for another 23 minutes, after which the cooling process was started to mark the end of reaction. The total reaction time was 25 minutes. The reaction product was worked-up as described in Example 1 and HPLC analysis revealed the compositions of each polymers of glycerol were as below. The treated polyglycerol yield was 78% and the conversion percentage of glycerol to polyglycerol was 79%. Typical composition of glycerol polymers for reaction product of Example 6
- 20.7% of unreacted glycerol
- 24.4% of diglycerol
- 21.0% of triglycerol
- 15.7% of tetraglycerol
- 10.9% of pentaglycerol
- 7.27% of hexaglycerol

The invention claimed is:

1. A process for preparing a linear polyglycerol composition, comprising 15-20% unreacted glycerol, 25-30% diglycerol, 20-25% triglycerol, 10-15% tetraglycerol, 10-15% pentaglycerol, and 1-5% hexaglycerol from glycerol, comprising exposing the glycerol to 900 W microwave irradiation for about 15 to 40 minutes at a reaction temperature of 270° C. in the presence of a catalyst;
    wherein the catalyst is a salt of alkaline metals and weak acids and the reaction temperature is raised from ambient to 270° C. in 2 minutes.

2. A process according to claim 1 where the catalyst is an anhydrous acetate or a hydrated acetate or a formate or a citrate of lithium, sodium, potassium or other "hard" electrophiles or a combination thereof.

3. A process according to claim 1 where the quantity of the catalyst used is 0.5 to 10 wt percent.

4. A process according to claim 2 where the quantity of the catalyst used is 0.5 to 10 wt percent.

5. A process according to claim 1 where the reaction time is 20 to 30 minutes.

6. A process according to claim 1 where the irradiation is provided by a microwave oven, microwave generator or equipment.

7. A process according to claim 1 where the reaction is conducted at a pressure of 1 atmosphere.

8. A process according to claim 1 where the catalyst is removed via treatment with a cationic ion exchanger.

9. A process according to claim 1 where water is removed from the preparation of polyglycerols by distillation.

10. A process for the preparation of polyglycerols in which glycerol is reacted in the presence of a catalyst at a reaction temperature of 270° C. for about 30 minutes by microwave irradiation;
    wherein the catalyst is a salt of alkaline metals and weak acids and the reaction temperature is raised from ambient to 270° C. in 2 minutes.

11. A process according to claim 1 where the catalyst is sodium formate.

12. A process according to claim 1 where the conversion percentage of polyglycerol from glycerol is from 75% to 85%.

13. A process according to claim 1, wherein the polymer is free of heptaglycerol.

14. A process according to claim 1, wherein the reaction temperature is maintained at 270° C. for 15 to 20 minutes.

* * * * *